United States Patent
Takori et al.

(10) Patent No.: US 12,233,773 B2
(45) Date of Patent: Feb. 25, 2025

(54) EXTERIOR LIGHT STRUCTURE FOR VEHICLE

(71) Applicant: HONDA MOTOR CO., LTD., Tokyo (JP)

(72) Inventors: Masayoshi Takori, Wako (JP); Yuji Tsuchiya, Wako (JP); Kei Oshida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/582,701

(22) Filed: Feb. 21, 2024

(65) Prior Publication Data

US 2024/0308417 A1    Sep. 19, 2024

(30) Foreign Application Priority Data

Mar. 17, 2023    (JP) ................. 2023-043185

(51) Int. Cl.
 *B60Q 1/26*    (2006.01)
 *F21S 43/50*    (2018.01)

(52) U.S. Cl.
 CPC ........... *B60Q 1/2623* (2013.01); *F21S 43/50* (2018.01)

(58) Field of Classification Search
 CPC . B60R 13/04; B60R 2019/525; B60R 19/525; B60R 19/52; B60Q 1/26; B60Q 1/02; B60Q 1/2623; F21S 43/50
 See application file for complete search history.

(56) References Cited

U.S. PATENT DOCUMENTS

| | | | |
|---|---|---|---|
| 10,507,769 B1* | 12/2019 | Glickman | B60R 5/02 |
| 2002/0011741 A1* | 1/2002 | Gille | B62D 29/043 |
| | | | 296/180.1 |
| 2005/0013140 A1* | 1/2005 | Currie | B60Q 1/32 |
| | | | 362/495 |
| 2018/0023778 A1* | 1/2018 | Gordon | B60Q 1/02 |
| | | | 362/547 |
| 2019/0168664 A1 | 6/2019 | Tatara et al. | |

FOREIGN PATENT DOCUMENTS

| | | | | |
|---|---|---|---|---|
| EP | 1762428 A1 * | 3/2007 | | B60K 11/08 |
| WO | 2018/021063 | 2/2018 | | |
| WO | WO-2024102888 A1 * | 5/2024 | | B60K 35/00 |

OTHER PUBLICATIONS

Inovation Q+ NPL Search (Year: 2024).*

* cited by examiner

*Primary Examiner* — Anabel Ton
(74) *Attorney, Agent, or Firm* — Amin, Turocy & Watson, LLP

(57) ABSTRACT

An exterior light structure is mounted in a vehicle including fender members and a hood member. The fender members are disposed in side parts of a vehicle body. The hood member is disposed adjacent to upper parts of the fender members. The exterior light structure includes lamp bodies 22. The lamp bodies 22 are disposed between the upper parts of the fender members and side edge parts of the hood member substantially in a vehicle body forward-rearward direction. The lamp bodies 22 radiate light to the outside of the vehicle through gaps d between the fender members and the hood member.

5 Claims, 4 Drawing Sheets

EXTERIOR LIGHT STRUCTURE FOR VEHICLE

CROSS-REFERENCE TO RELATED APPLICATION

Priority is claimed on Japanese Patent Application No. 2023-43185, filed Mar. 17, 2023, the content of which is incorporated herein by reference.

BACKGROUND OF THE INVENTION

Field of the Invention

The present invention relates to an exterior light structure for a vehicle.

Description of Related Art

In recent years, regarding exterior lights mounted in vehicles, an exterior light in which lamp bodies are lit for the purpose of notifying pedestrians and drivers of other vehicles of an external detection state on the vehicle side has been devised (for example, refer to PCT International Publication No. WO2018/921063).

In the exterior light disclosed in PCT International Publication No. WO2018/921063, a plurality of lamp bodies (communication lamps) are disposed around each of left and right headlights on a front surface of a vehicle. When the vehicle detects a pedestrian using a detection means, the lamp bodies disposed around the headlights perform lighting or blinking to notify the pedestrian of the detection state.

SUMMARY OF THE INVENTION

However, in the exterior light disclosed in PCT International Publication No. WO2018/921063, lamp bodies for communication are disposed around headlights on a front surface of a vehicle. For this reason, for example, in a situation in which the visual line of a pedestrian is directed toward an exterior side surface of a vehicle body when the vehicle is making a turn or the like at an intersection, it is difficult for the pedestrian to clearly visually recognize the situation of lighting or blinking of the lamp bodies for communication.

Hence, the present invention provides an exterior light structure for a vehicle allowing a viewer such as a pedestrian to clearly visually recognize light of lamp bodies even in a situation in which the visual line of the viewer is directed toward an exterior side surface of a vehicle body. Further, the present invention aims to further improve traffic safety and contribute to development of sustainable transportation systems as well.

The exterior light structure for a vehicle according to the present invention employs the following constitutions.

That is, the exterior light structure for a vehicle according to the present invention includes fender members (for example, front fenders 10 of an embodiment) which are disposed in side parts of a vehicle body, and a hood member (for example, a front hood 11 of the embodiment) which is disposed adjacent to upper parts of the fender members. The exterior light structure for a vehicle includes lamp bodies (for example, lamp bodies 22 of the embodiment). The lamp bodies are disposed between the upper parts of the fender members and side edge parts of the hood member substantially in a vehicle body forward-rearward direction and radiate light to the outside of the vehicle through gaps (for example, gaps d of the embodiment) between the fender members and the hood member.

In the foregoing exterior light structure, if the lamp bodies of the exterior light are lit, light of the lamp bodies is radiated to the outside of the vehicle through the gaps between the fender members and the hood member. As a result, boundary parts between the fender members and the hood member shine and clearly come into sight of a viewer whose visual line is directed to a side surface of the vehicle body.

In addition, in the exterior light structure having this constitution, since the boundary parts between the fender members and the hood member shine and come into sight when the lamp bodies of the exterior light are lit, it is possible to curb deterioration in design of the exterior appearance due to the lamp bodies viewed from the outside. Moreover, in this constitution, since the lamp bodies of the exterior light do not protrude from the side parts of the vehicle body to the outward sides in a vehicle width direction, it is possible to curb extension of the vehicle width due to the lamp bodies.

The lamp bodies may radiate light to the outside of the vehicle by reflecting light on at least one of the hood member and the fender members.

In this case, since light emitted by the lamp bodies is reflected by at least one of the hood member and the fender members and is radiated to the outside of the vehicle, the light comes into sight of a viewer who visually recognizes the side part of the vehicle body as light that is gently diffused around the viewer. For this reason, it is possible to have a favorable appearance when the exterior light is lit.

Elastic members (for example, elastic members 40 of the embodiment) allowing light of the lamp bodies to be transmitted therethrough and coming into tight contact with the fender members and the hood member may be disposed in the gaps between the fender members and the hood member.

In this case, the elastic members can curb entry of water droplets and dust into a space below the hood member through the gaps between the fender members and the hood member. In addition, since the elastic members disposed between the fender members and the hood member have properties of allowing light to be transmitted therethrough, light emitted by the exterior light can be gently diffused and radiated to the outside of the vehicle. For this reason, it is possible to have a favorable appearance when the exterior light is lit.

Lamp body disposition recessed parts (for example, lamp body disposition recessed parts 30a of the embodiment) for disposing the lamp bodies below the elastic members may be provided in the upper parts of the fender members.

In this case, since the lamp bodies of the exterior light are disposed in the lamp body disposition recessed parts in the upper parts of the fender members, the lamp bodies do not restrict disposition spaces for the elastic members. Moreover, electric wiring with respect to the lamp bodies can be easily performed from the inward sides of the fender members through the lamp body disposition recessed parts.

In the exterior light structure for a vehicle according to the present invention, the lamp bodies are disposed between the upper parts of the fender members and the side edge parts of the hood member substantially in the vehicle body forward-rearward direction, and the boundary parts between the fender members and the hood shine and come into sight when the lamp bodies are lit. Therefore, when the exterior light structure for a vehicle according to the present invention is employed, a viewer such as a pedestrian can clearly visually recognize light of the lamp bodies even in a situation in which the visual line of the viewer is directed toward an exterior side surface of the vehicle body. As a result, it is possible to further improve traffic safety and contribute to development of sustainable transportation systems.

DETAILED DESCRIPTION OF THE INVENTION

Figure 1:
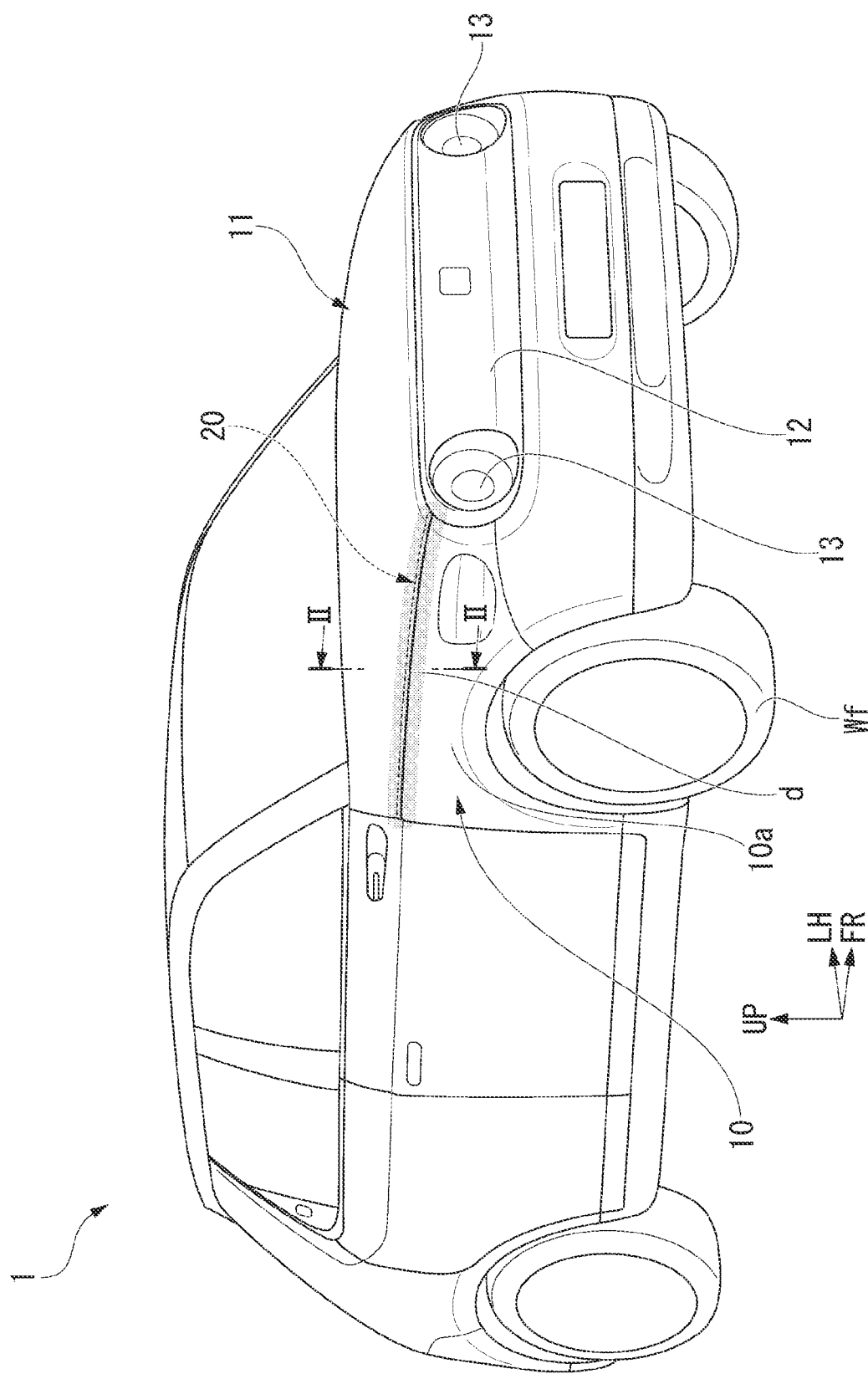
FIG. 1 is a perspective view of a vehicle of an embodiment.

Hereinafter, embodiments of the present invention will be described based on the drawings.

In each of the embodiments which will be described below, the same reference signs are applied to common parts, and some of duplicate description will be omitted. In addition, an arrow UP indicating a side above a vehicle, an arrow FR indicating a side in front of the vehicle, and an arrow LH indicating the left side of the vehicle are marked at suitable locations in the drawings.

FIG. 1 is a perspective view of a vehicle 1 of the present embodiment.

In FIG. 1, the reference sign 10 indicates front fenders (fender members) of the vehicle 1, and the reference sign 11 indicates a front hood (hood member) covering a motor compartment in front of a cabin of the vehicle 1 from above such that it can be opened and closed. The front fenders 10 are exterior panels disposed around respective outward sides of left and right front wheels Wf of the vehicle 1 and are disposed in side parts of a vehicle body on a front side. For example, the front hood 11 is turnably supported in a rear wall part of the motor compartment with a rear end side as a hinge fulcrum. Side edge parts of the front hood 11 are disposed adjacent to upper parts of the front fenders 10 on the same left and right sides. A grille 12 is disposed on a front surface in front of the motor compartment of the vehicle 1, and headlights 13 are disposed on both the left and right sides of the grille 12.

The vehicle 1 of the present embodiment is an electric vehicle having an electric motor as a drive source, but the drive source of the vehicle 1 is not limited to this. The drive source of the vehicle 1 may also be an internal-combustion engine or a hybrid drive source using both an internal-combustion engine and an electric motor.

The vehicle 1 of the present embodiment has a function of detecting positions of pedestrians outside the vehicle and other vehicles and notifying the pedestrians and drivers of other vehicles of the recognition situation of the driver with respect to the pedestrians and other vehicles at this time. The vehicle 1 can notify pedestrians and drivers of other vehicles of the recognition situation of the driver by lighting exterior lights 20 (which will be described below) in various forms.

Specifically, for example, the vehicle 1 includes a position detection means for detecting positions of pedestrians outside the vehicle and other vehicles, a visual line detection means for detecting a visual line direction of a driver, and a controller controlling lighting of the exterior lights 20 (which will be described below) based on detection results of the position detection means and the visual line detection means.

Regarding the position detection means, for example, it is possible to employ a detection means for directly detecting pedestrians and other vehicles using an in-vehicle instrument such as a LIDAR, a millimeter wave radar, or a camera, or a detection means for acquiring positional information of pedestrians outside the vehicle and other vehicles through satellite communication or terrestrial communication. In addition, regarding the visual line detection means, for example, it is possible to employ a detection means for detecting the visual line direction of a driver by reflecting infrared rays on the cornea of the driver, or a detection means for detecting the visual line direction of a driver through image analysis of an in-vehicle camera.

Figure 2:
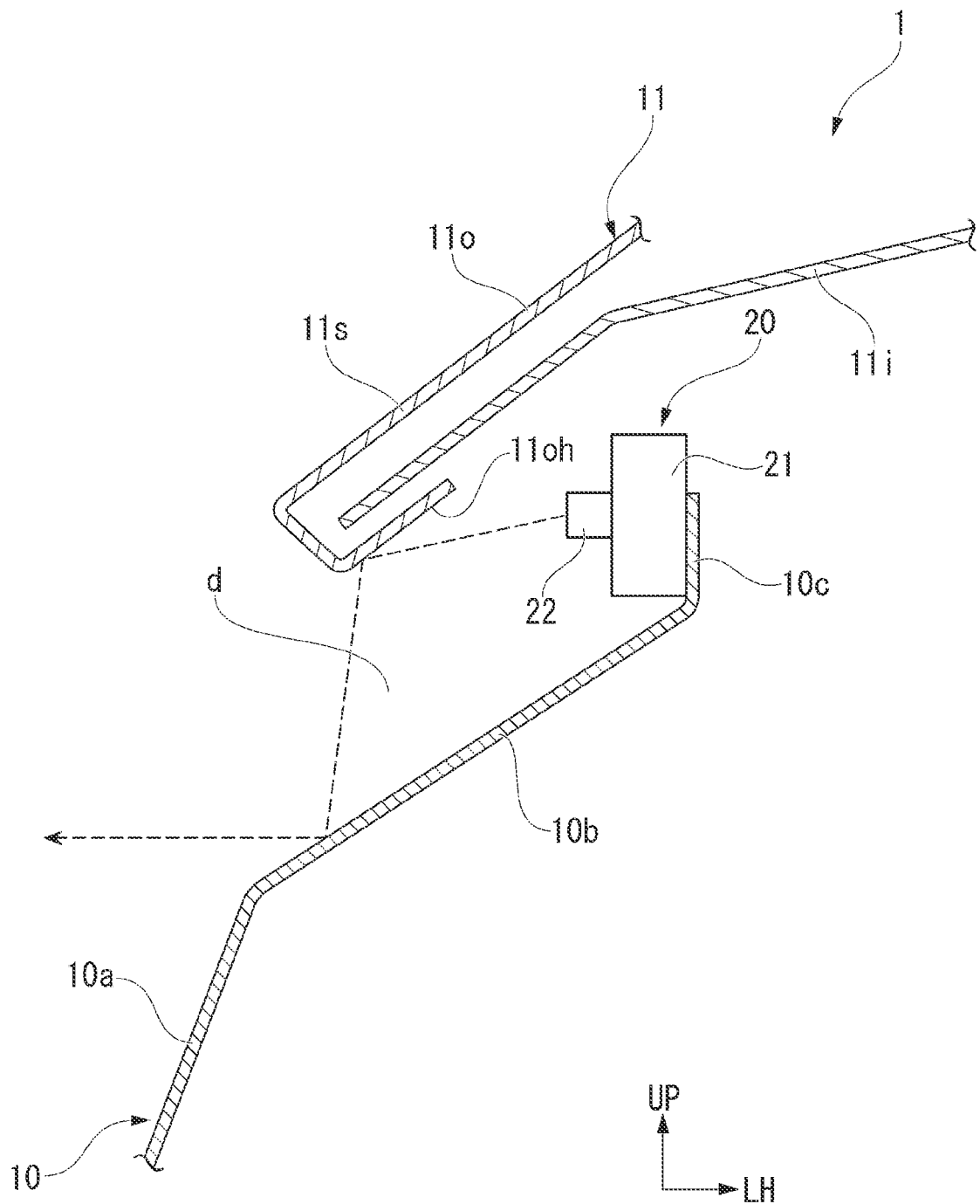
FIG. 2 is a cross-sectional view of the vehicle of the embodiment along line II-II in FIG. 1.

FIG. 2 is a cross-sectional view of the vehicle 1 along line II-II in FIG. 1.

As shown in FIG. 2, the front fenders 10 each have a fender main body part 10a which has substantially a U-shaped opening (refer to FIG. 1) substantially along an outer contour of the front wheel Wf, an inclined wall 10b which is inclined obliquely upward to the inward side in a vehicle width direction from an upper end part of the fender main body part 10a, and an end part wall 10c which is bent and extends vertically upward from an extension end of the inclined wall 10b.

In addition, as shown in FIG. 2, the front hood 11 has a hood panel outer 11o which is positioned on the outward side of the vehicle, and a hood panel inner 11i which faces the inside of the motor compartment. A hemming bent part 11oh is provided at an outer circumferential edge part of the hood panel outer 11. The hood panel outer 11 and the hood panel inner 11i are fixed to each other by the hemming bent part 11oh. Left and right side edge parts 11s of the front hood 11 are inclined downward at a predetermined angle toward the outward side in the vehicle width direction. Parts of the side edge parts 11s inclined downward overlap the inclined walls 10b of the front fenders 10 in the vehicle width direction at the upper parts of the front fenders 10. The side edge parts 11s of the front hood 11 are inclined substantially parallel to the inclined walls 10b of the front fenders 10.

Gaps d are secured between the upper parts of the front fenders 10 (the inclined walls 10b and the end part walls 10c) and the side edge parts 11s on the same left and right sides of the closed front hood 11. The gaps d extend substantially in a vehicle body forward-rearward direction along the upper end shapes of the fender main body parts 10a. The exterior lights 20 of the present embodiment are disposed on the inward sides of the gaps d. Specifically, the exterior lights 20 are attached to outer side surfaces of the end part walls 10c in the upper parts of the front fenders 10 in the vehicle width direction.

As shown in FIG. 2, in each of the exterior lights 20, a plurality of lamp bodies 22 such as LED light emitting elements are mounted on a substrate 21 extending substantially in the vehicle body forward-rearward direction. The substrate 21 is attached to the end part wall 10c of the front fender 10. The plurality of lamp bodies 22 are arrayed in a longitudinal direction (vehicle body forward-rearward direction) of the substrate 21. The lamp bodies 22 are not limited to LED light emitting elements, and any one may be adopted as long as light can be radiated through control of the controller.

The plurality of lamp bodies 22 constituting the exterior lights 20 are disposed such that a radiation direction of light is directed to rear surfaces of the side edge parts 11s of the front hood 11. For example, as indicated by the arrow in FIG. 2, light of the plurality of lamp bodies 22 is reflected by the rear surface of the side edge part 11s of the front hood 11, is then reflected by the upper surface of the inclined wall 10b of the front fender 10, and is radiated to the outward side in the vehicle width direction.

However, light emitted from the lamp bodies 22 of the exterior light 20 need only be reflected once or more by at least one of the front hood 11 and the front fender 10.

Figure 3A:
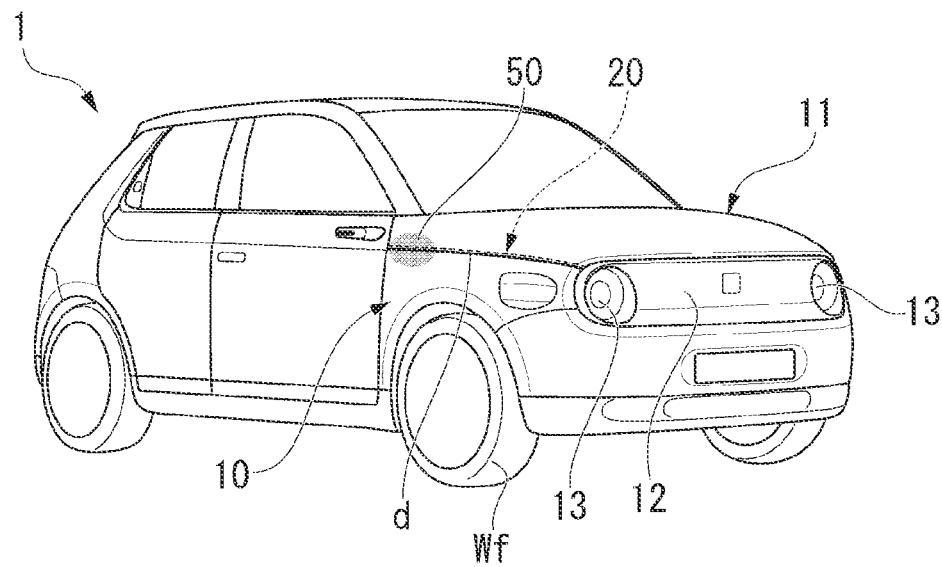
FIGS. 3A, 3B and 3C are a perspective view of the vehicle sequentially showing lighting states of exterior lights of the embodiment.
Figure 3B:
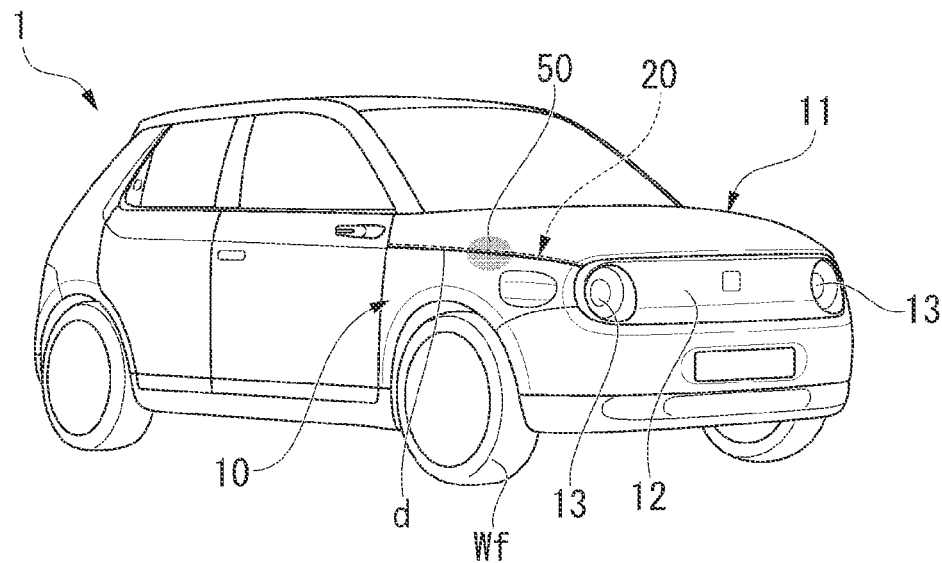
Figure 3C:
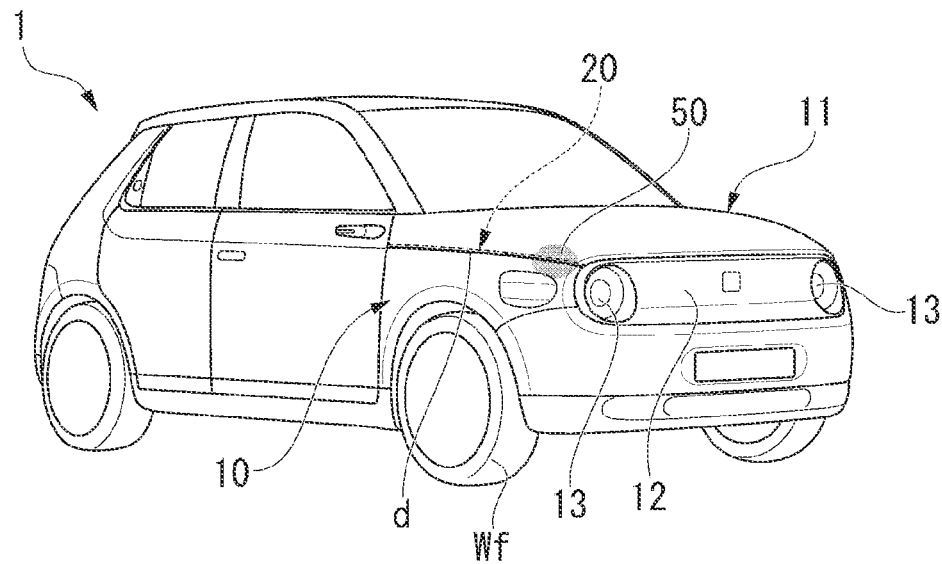

Subsequently, an example of operation of the exterior light 20 will be described with reference to FIGS. 3A, 3B and 3C. FIGS. 3A, 3B and 3C sequentially shows a way of lighting the exterior light 20 when the vehicle 1 enters an intersection in a state of turning to the right and a pedestrian is walking on a crosswalk toward the front side of the vehicle 1 obliquely from the right side behind the vehicle 1.

If the vehicle 1 enters the intersection in a state of turning to the right, the position detection means detects the pedestrian walking on a crosswalk. At this time, the visual line detection means detects the visual line of the driver, and when the visual line of the driver is directed in the direction of the pedestrian, the exterior light 20 in its entirety is lit in a certain color (for example, green) through control of the controller. However, the lamp bodies 22 matching the visual line of the driver are lit in a color (for example, white) different from the lighting color of the entirety. The reference sign 50 in each of FIGS. 3A, 3B, and 3C indicates a different color lighting region lit in a color different from the lighting color of the entirety. Rays of the light are radiated to the side part of the vehicle through the gap d between the front hood 11 and the front fender 10, and the pedestrian can visually recognize the radiated light.

At this time, as the visual line of the driver moves toward the front side from a lateral side of the vehicle in pursuit of the walking pedestrian, the different color lighting region 50 moves to the front side of the vehicle in response thereto along the gap d between the front fender 10 and the front hood 11 as sequentially shown in FIGS. 3A, 3B, and 3C. As a result, the pedestrian can ascertain that the driver of the vehicle 1 recognizes (looks after) the behavior of the pedestrian based on the lighting situation of the exterior light 20.

As above, in the exterior light structure for a vehicle of the present embodiment, a plurality of lamp bodies 22 are disposed between the upper parts of the front fenders 10 and the side edge parts of the front hood 11 substantially in the vehicle body forward-rearward direction, and light is radiated to the outside of the vehicle through the gaps d between the front fenders 10 and the front hood 11. For this reason, the boundary parts between the front fenders 10 and the front hood 11 shine and come into sight when the lamp bodies 22 are lit.

Therefore, when the exterior light structure for a vehicle of the present embodiment is employed, a viewer such as a pedestrian can clearly visually recognize light of the lamp bodies 22 even in a situation in which the visual line of the viewer is directed toward the exterior side surface of the vehicle body. As a result, it is possible to further improve traffic safety and contribute to development of sustainable transportation systems.

In addition, in the exterior light structure for a vehicle of the present embodiment, since the boundary parts between the front fenders 10 and the front hood 11 shine and come into sight when the lamp bodies 22 are lit, it is possible to curb deterioration in the design of the exterior appearance due to the lamp bodies 22 viewed from the outside. Moreover, in this constitution, since the lamp bodies 22 do not protrude from the side parts of the vehicle body to the outward sides in the vehicle width direction, it is possible to curb extension of the vehicle width due to the lamp bodies 22.

Moreover, in the exterior light structure for a vehicle of the present embodiment, the lamp bodies 22 of the exterior lights 20 are disposed such that emitted light is reflected by at least one of the front hood 11 and the front fenders 10 and light is radiated to the outside of the vehicle. For this reason, light emitted by the lamp bodies 22 comes into sight of a viewer who visually recognizes the side part of the vehicle body as light that is gently diffused around the viewer. Therefore, when this constitution is employed, it is possible to have a favorable appearance when the exterior light 20 is lit.

Other Embodiments

Figure 4:
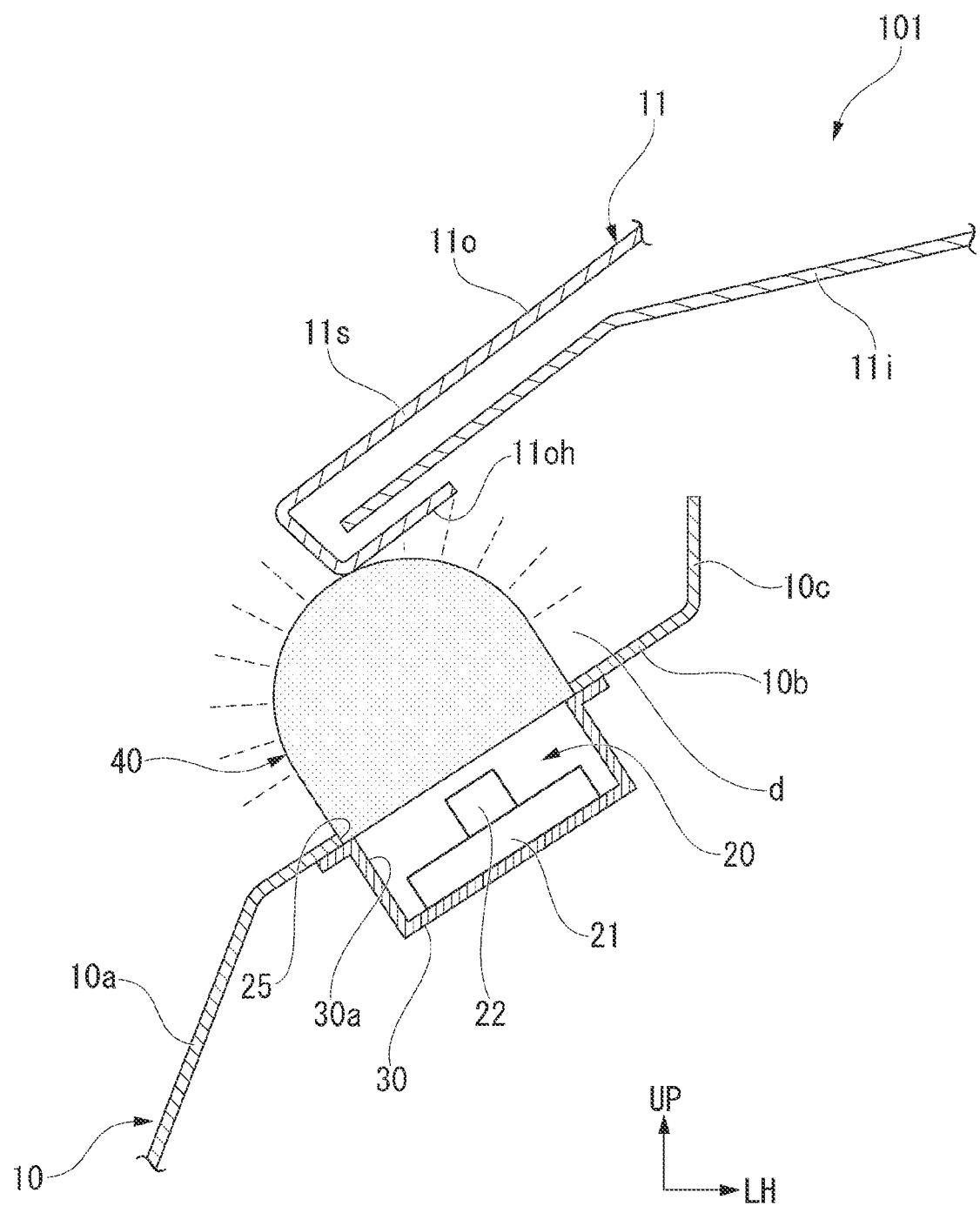
FIG. 4 is a cross-sectional view of a vehicle of another embodiment similar to FIG. 2.

FIG. 4 is a cross-sectional view of a vehicle 101 of the present embodiment similar to FIG. 2.

In the exterior light structure for a vehicle of the present embodiment, similar to the foregoing embodiment, the gaps d are secured between the upper parts of the front fenders 10 (the inclined walls 10b and the end part walls 10c) and the side edge parts 11s on the same left and right sides of the closed front hood 11. A long hole 25 extending in the vehicle body forward-rearward direction is formed in the inclined wall 10b of the front fender 10. Further, a support bracket 30 forming a lamp body disposition recessed part 30a together with the long hole 25 is formed on a lower surface of the inclined wall 10b. The exterior light 20 extending substantially in the vehicle body forward-rearward direction is installed inside the lamp body disposition recessed part 30a. Similar to the foregoing embodiment, the exterior light 20 includes the substrate 21 and a plurality of lamp bodies 22. A light emitting direction of each of the lamp bodies 22 is directed upward.

An elastic member 40 having substantially a semicircular cross section orthogonal to the vehicle body forward-rearward direction is attached to an upper surface side of the inclined wall 10b of the front fender 10. The elastic member 40 is constituted using an elastomer such as light-transmitting silicon or rubber. The elastic member 40 is formed to be elongated in the vehicle body forward-rearward direction such that the flat lower surface covers the entire region of the long hole 25 of the inclined wall 10b. The lamp body disposition recessed part 30a for disposing the lamp bodies 22 is disposed below the elastic member 40.

In addition, the lower surface of the side edge part 11s of the front hood 11 abuts the elastic member 40 attached to the inclined wall 10b of the front fender 10 when the front hood 11 is closed. At this time, the elastic member 40 absorbs an impact by elastic deformation when the front hood 11 is closed, and seals the gap d between the front fender 10 and the front hood 11.

In the case of the present embodiment, in a state in which the front hood 11 is closed, a part of the elastic member 40 on the arc-shaped outer side surface is positioned on the outward side in the vehicle width direction from the side edge part 11s of the front hood 11.

Since the exterior light structure for a vehicle of the present embodiment has a basic constitution similar to that of the foregoing embodiment, it is possible to achieve basic effects similar to those of the foregoing embodiment described above.

In addition, in the exterior light structure for a vehicle of the present embodiment, the elastic member 40 allowing light of the lamp bodies 22 to be transmitted therethrough and coming into tight contact with the front fender 10 and the front hood 11 is disposed in the gap d between the front fender 10 and the front hood 11. For this reason, the elastic member 40 can curb entry of water droplets and dust into a space (motor compartment) below the front hood 11 through the gap d.

In addition, in this constitution, since the elastic member 40 has properties of allowing light of the lamp bodies 22 to be transmitted therethrough, light emitted by the exterior light 20 can be gently diffused and radiated to the outside of the vehicle. Therefore, when this constitution is employed, it is possible to have a favorable appearance when the exterior light 20 is lit.

Moreover, in the exterior light structure for a vehicle of the present embodiment, the lamp body disposition recessed parts 30a for disposing the lamp bodies 22 below the elastic members 40 are provided in the upper parts (inclined walls 10b) of the front fenders 10. For this reason, the lamp bodies 22 do not restrict disposition spaces for the elastic members 40 in the vehicle width direction, and therefore the elastic members can have a sufficient volume. Therefore, when this constitution is employed, a cushioning performance at the time of a closing operation of the front hood 11 can be enhanced.

Moreover, in this constitution, since the lamp body disposition recessed parts 30a, which are recessed downward, are provided in the upper parts (inclined walls 10b) of the front fenders 10, electric wiring with respect to the lamp bodies 22 (substrate 21) can be easily performed from the inward sides of the front fenders 10 through the lamp body disposition recessed parts 30a.

The present invention is not limited to the foregoing embodiments, and various design changes can be made within a range not departing from the gist thereof. For example, control of lighting the lamp bodies 22 of the exterior lights 20 is not limited to the example described above. The situation of lighting the lamp bodies 22 and the way of lighting may be other than those described above. In addition, the gaps d between the front fenders 10 and the front hood 11 for radiating light of the lamp bodies 22 to the outside may also extend to a part on the front side of the vehicle.

In addition, in the foregoing embodiments, a plurality of lamp bodies 22 of the exterior lights 20 are installed between the front fenders 10 in the front part of the vehicle and the side edge parts of the front hood 11. However, disposition of the exterior lights 20 is not limited to this. For example, in the case of a vehicle having rear fenders and a rear hood in a rear part of the vehicle, a plurality of lamp bodies of exterior lights may be disposed between the rear fenders and side edge parts of the rear hood. In addition, regarding the lamp bodies, one light guide body extending substantially in the vehicle body forward-rearward direction may be disposed between the upper parts of the fender members and the side edge parts of the hood member.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1, 101 Vehicle
10 Front fender (fender member)
11 Front hood (hood member)
20 Exterior light
22 Lamp body
30a Lamp body disposition recessed part
40 Elastic member
d Gap

What is claimed is:

1. An exterior light structure for a vehicle including fender members which are disposed in side parts of a vehicle body, and a hood member which is disposed adjacent to upper parts of the fender members, the exterior light structure for a vehicle comprising:
   lamp bodies,
   wherein the lamp bodies are disposed between the upper parts of the fender members and side edge parts of the hood member substantially in a vehicle body forward-rearward direction and radiate light to the outside of the vehicle through gaps between the fender members and the hood member,
   wherein the lamp bodies radiate light to the outside of the vehicle by reflecting light on at least one of the hood member and the fender members.

2. An exterior light structure for a vehicle including fender members which are disposed in side parts of a vehicle body, and a hood member which is disposed adjacent to upper parts of the fender members, the exterior light structure for a vehicle comprising:
   lamp bodies,
   wherein the lamp bodies are disposed between the upper parts of the fender members and side edge parts of the hood member substantially in a vehicle body forward-rearward direction and radiate light to the outside of the vehicle through gaps between the fender members and the hood member, and
   wherein elastic members allowing light of the lamp bodies to be transmitted therethrough and coming into tight contact with the fender members and the hood member are disposed in the gaps between the fender members and the hood member.

3. The exterior light structure for a vehicle according to claim 2,
   wherein lamp body disposition recessed parts for disposing the lamp bodies below the elastic members are provided in the upper parts of the fender members.

4. An exterior light structure for a vehicle including fender members which are disposed in side parts of a vehicle body, and a hood member which is disposed adjacent to upper parts of the fender members, the exterior light structure for a vehicle comprising:
   lamp bodies,
   wherein the lamp bodies are disposed between the upper parts of the fender members and side edge parts of the hood member substantially in a vehicle body forward-rearward direction and radiate light to the outside of the vehicle through gaps between the fender members and the hood member, and
   wherein the lamp bodies are disposed continuously from a front part forward of a center of the vehicle body forward-rearward direction in the gap to a rear part rearward of the center of the vehicle body forward-rearward direction in the gap.

5. The exterior light structure for a vehicle according to claim 4, wherein lamp body disposition recessed parts for disposing the lamp bodies below the elastic members are provided in the upper parts of the fender members.

\* \* \* \* \*